United States Patent [19]

Schmidt

[11] 3,758,701
[45] Sept. 11, 1973

[54] SPACER MEANS FOR A SUPERCONDUCTIVE ELECTRICAL CABLE

[75] Inventor: Fritz Schmidt, Erlangen, Germany

[73] Assignee: Siemens Aktiengesellschaft, Munich, Germany

[22] Filed: Aug. 10, 1972

[21] Appl. No.: 279,393

[30] Foreign Application Priority Data
Aug. 17, 1971 Germany.................. P 21 71 202.2

[52] U.S. Cl............. 174/28, 174/15 C, 174/DIG. 6, 29/599, 29/624, 138/113
[51] Int. Cl......................... H01b 9/04, H01v 11/00
[58] Field of Search...................... 174/28, 29, 16 B, 174/99 B, 15 C, DIG. 6; 29/599, 624; 138/111, 112, 113, 114

[56] References Cited
UNITED STATES PATENTS

| | | | |
|---|---|---|---|
| 2,944,608 | 7/1960 | Rush | 174/28 |
| 3,604,832 | 9/1971 | Kohler | 174/15 C |
| 3,657,467 | 4/1972 | Matthaus | 174/15 C |

FOREIGN PATENTS OR APPLICATIONS

| | | | |
|---|---|---|---|
| 1,167,054 | 10/1969 | Great Britain | 174/15 C |

*Primary Examiner*—Bernard A. Gilheany
*Assistant Examiner*—A. T. Grimley
*Attorney*—Hugh A. Chapin

[57] ABSTRACT

An electrical cable which includes an electrical superconductor immersed in liquid coolant. The cable includes inner and outer tubular conduits with the inner conduit enclosing the electrical superconductor and the liquid coolant. At least two support elements are positioned between the conduits to provide support for the adjacent region of the inner conduit to maintain it in spaced coaxial relation within the outer conduit. Each support element includes a slender arch-shaped member having axially spaced first and second ends and an apex intermediate the ends spaced radially therefrom. The ends of each support element are fixedly connected with one of the conduits and a sliding connection is provided between its apex and the other of the conduits. At least one annular strut connects the support elements so that they are braced together.

11 Claims, 3 Drawing Figures

SPACER MEANS FOR A SUPERCONDUCTIVE ELECTRICAL CABLE

BACKGROUND OF THE INVENTION

This invention relates to an electrical cable of the type including an electrical superconductor immersed in liquid coolant. More particularly the invention relates to such a cable in which the conductor and coolant are enclosed within an inner conduit which is supported in generally coaxial relation within an outer conduit.

In the transmission of alternating current, it is known to utilize electrical conductors which are immersed in liquified gas which is maintained at an extremely low temperature which is the transition temperature of the conductors so that they have a characteristic known as superconductivity. An electrical conductor in a state of superconductivity will hereinafter be referred to as a superconductor.

Such cables usually comprise spaced, concentric, inner and outer conduits. The inner conduit, sometimes referred to as the cooling tube, encloses the superconductor and the liquid coolant which may be, for example, liquified helium. A cryovacuum is created between the conduits after preliminary evacuation so that heat transfer by conduction between them occurs substantially only at spacers mounted between the conduits for the purpose of supporting the inner conduit in spaced coaxial position. The outer conduit usually consists of material with a high thermal conductivity such as aluminum or copper and is kept at a low temperature (for example 77° K) by liquid nitrogen circulated along a pipe in communication with its exterior. The outer conduit substantially prevents transmission of radiant heat from the ambient atmosphere outside the cable to the cooling tube and is therefore sometimes referred to as a radiation shield. The outer conduit is itself surrounded by a tubular, external sheath, which may be made of steel, and the space between the outer conduit and the external sheath is evacuated in order to limit heat transfer by conduction. The space between the outer tube and the sheath may be partially filled with a large number of stacked, metallized thin foils of plastic material and similar foils may be employed between the inner and outer tube. Such a prior structure is generally disclosed, for example, in German Published Pat. application No. 1,640,750.

One problem with the use of foils of superinsulation in the inner space between the cooling tube and the radiation shield, is the heat conduction between the contact points of the foils. It would be desirable, therefore, to avoid the use of such foils but to do so would create a problem of supporting the conduits in coaxial relation. In the previously mentioned German Published application, one structure for supporting the inner conduit comprises thin filaments stretched between it and the outer conduit. However, the use of filaments creates construction problems because in that prior structure it is first necessary to remove the external sheath before positioning the filaments between the inner and outer conduits, followed by a further manufacturing step of replacing the external sheath after doing so.

It is therefore desirable to provide a structure for a superconductive electrical cable of the type generally described in which heat transfer between the cooling tube and radiation shield is minimized and in which assembly of the inner and outer tubes in coaxial relation may be easily accomplished.

SUMMARY OF THE INVENTION

The present invention provides an electrical cable of the type including a superconductor immersed in liquid coolant, which is intended to obviate or minimize problems of the type previously noted.

In particular, an electrical cable according to the invention includes an electrical superconductor immersed in liquid coolant. The cable includes inner and outer, generally tubular conduits with the inner conduit enclosing the electrical superconductor and its liquid coolant. At least two support elements are positioned between the conduits extending in an axial direction. The support elements are positioned to provide support for the adjacent region of the inner conduit, which is evenly distributed so as to keep it in spaced coaxial relation within the outer conduit. Each of the support elements is formed as a slender arch-shaped member having axially spaced first and second ends and an apex intermediate the ends spaced radially therefrom. The ends of the arch-shaped member are fixedly connected to one of the conduits. At its apex, a sliding contact is provided between the arch member and the other of the conduits. At least one peripherally extending strut connects the support elements to brace them together.

By this construction, the inner and outer tubes may be relatively easily assembled together by sliding the inner tube into the outer tube during the manufacturing process.

In a further feature of the invention the arch-like elements are long and slender with the axial dimension being considerably greater than the radial dimension. In addition they are constructed of poor heat conducting materials such as nickel, nickel silver or invar so that there is very poor transmission of heat along the support elements between the points of attachment of the ends of the arch member to one of the conduits and the point of contact of its apex to the other of the conduits.

BRIEF DESCRIPTION OF THE DRAWINGS

A superconductive electrical cable constructed in accordance with a preferred embodiment of the invention and certain additional embodiments, is illustrated in the accompanying drawings in which.

DETAILED DESCRIPTION

Figure 1:
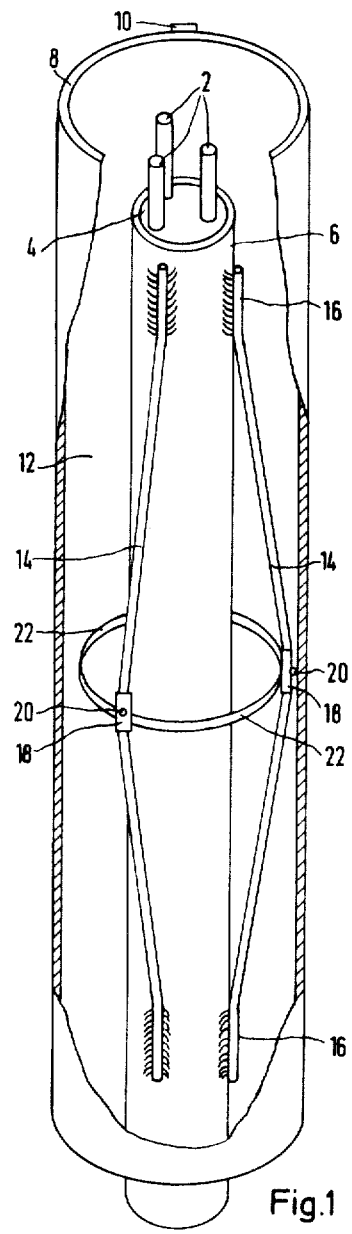
FIG. 1 is a perspective view partially in cross section of an electrical cable constructed in accordance with a preferred embodiment of the invention.

Referring to FIG. 1 of the drawings, a superconductive electrical cable constructed in accordance with a preferred embodiment of the invention is there shown.

The cable includes three electrical conductors 2 (which may, for example, constitute a three phase electrical cable) immersed in a liquid coolant 4 passed through an inner conduit 6, which constitutes a cooling tube enclosing the conductors. The liquid coolant is at a sufficiently low temperature to maintain the conductors 2 below the transition temperature of the metal from which they are formed so that they function as superconductors. Typically the liquid coolant may be a liquified gas such as liquid helium. Spaced about the inner conduit 6 is a concentric outer conduit 8 which is fabricated from a material of high heat conductivity, preferably aluminum or copper, and is cooled by a coolant conducted through a tube 10 extending axially along the exterior surface of the outer conduit 8 in heat conducting relation with it. The coolant passed through the tube 10 is preferably liquid nitrogen which maintains the outer conduit 8 at a temperature of about 77° K. Thus the cooled outer conduit functions as a radiation shield to prevent ambient heat from outside the cable from being radiated to the inner conduit 6. The space 12 between the conduits 6 and 8 is evacuated to a vacuum of about $10^{-5}$ Torr. In addition the exterior surface of the inner conduit and the interior surface of the outer conduit may be provided with a coating having a high degree of reflectivity to infrared radiation to reduce radiation losses.

A particular feature of the invention resides in the structure utilized to support the inner conduit 6 in spaced concentric relation within the outer conduit 8. In the preferred embodiment this structure includes a number of sets of support elements 14, spaced at different regions along the cable. The elements 14 are positioned between the conduits extending in an axial direction. Each of the support elements 14 is formed as a slender arch-shaped member having axially spaced end regions 16. A mounting 18 is provided at the apex of each support element 14 intermediate its ends spaced radially from them. The ends 16 of each element are bent to lie flat against the exterior of the inner conduit 6 and are fixed to it by soldering or welding. Before the welding operation is performed force is applied to the opposite ends 16 of each element so that it is pretensioned before it is fixedly secured to the inner conduit 6. The mounting 18 supports a ball bearing 20 which is in sliding contact with the interior of the outer conduit 8.

At a region of the cable at which a set of the support elements 14 is provided, the disposition of the elements 14 about the inner conduit is so arranged as to provide equally distributed support maintaining it in concentric relation within the outer conduit. Thus, in the preferred embodiment three of the support elements are provided spaced equally at 120° intervals about the inner conduit so that it is supported symmetrically within the outer conduit and maintained in concentric relation. If only two of the support elements 14 were utilized it would be necessary to position them in diametrical opposition on opposite sides of the inner conduit to provide equilibrated support that would hold it in concentric relation within the outer conduit. To brace the support elements and assist them in maintaining their positional relationship relative to each other to maintain distributed support for the inner conduit, a peripherally extending annular strut 22 connecting the several mountings 20 of the three support elements 14, is provided.

The support elements 14 are made of material which are poor heat conductors at low temperature such as stainless steel, nickel, nickel-silver, invar, plastic or ceramic materials. The axial distance between the ends of each support element 14 is considerably greater than the radial distance between its apex and its ends, giving it a configuration like an archer's bow of shallow curvature. As the element 14 is relatively long in relation to its curvature, the distance between its points of contact with the inner and outer conduits is such that, in view of the poor heat conductivity of the material, heat transmission by conduction along the element is kept very low.

Another advantage of the construction described is the sliding contact afforded between the support elements and the outer conduit 8 which permits the inner and outer conduits to undergo different degrees of thermal expansion, depending upon their different temperatures, without creating thermal stresses in the cable.

Figure 2:
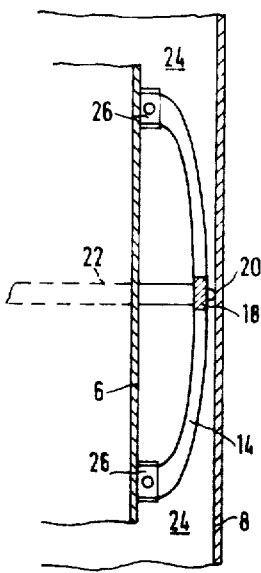
FIG. 2 is a cross sectional side view of a portion of an electrical cable constructed in accordance with a second embodiment of the invention.

In a second embodiment of the invention shown in FIG. 2, the support elements 14 are of relatively shortened configuration compared with the support elements 14 of the preferred embodiment, although the distance between he axial ends of the support element still exceeds the radial distance between the apex and the ends. In addition the end portions of a support element are not bent flat to lie against the inner conduit but instead terminate in abutting contact with the inner conduit so that the general conformation of the support element resembles a skid or runner rather than the archer's bow shape of the preferred embodiment. To stabilize the ends of the element 14 against the inner conduit 6, annular upper and lower collars are fixedly secured to the exterior of the inner tube to receive and mount the ends of the support elements 14. A peripherally extending strut 22, encircles and connects the mountings 18 at the apexes of the support elements. Ball bearings 20 are carried by the mountings 18 in contact with the outer conduit 8.

Figure 3:
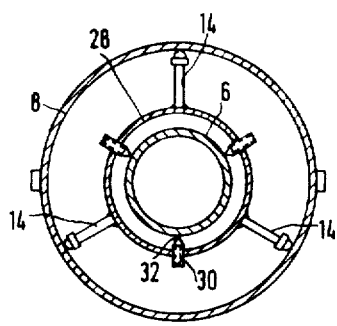
FIG. 3 is a cross sectional end view of an electrical cable constructed in accordance with a third embodiment of the invention.

In a third embodiment of the invention shown in FIG. 3 the ends 16 of the support elements 14 are not secured directly to the inner conduit 6. Instead, intermediate ring members 28 are positioned at the upper and lower ends of the support elements encircling and spaced from the inner conduit 6. The ends 16 of the support elements 14 are fixedly secured to the upper and lower ring members 28. Each of the ring members 28 is provided with three equally distributed pins 30 spaced intermediate the support elements 14. The pins 30 have sharpened inner points 32 which contact the adjacent exterior surface of the inner conduit 6 to mount the ring member on the inner conduit. The point contact thus achieved is further effective in reducing heat conduction losses via the structure supporting the inner conduit within the outer conduit.

What is claimed is:

1. An electrical cable of the type including an electrical superconductor immersed in liquid coolant, the cable comprising, inner and outer, generally tubular conduits, said inner conduit adapted to enclose the electrical superconductor and the liquid coolant, at least two support elements extending between said conduits extending In an axial direction, said support elements so positioned In relation to said inner conduit as to maintain the adjacent portion thereof in spaced coaxial relation within said outer conduit, each said support element including, a slender, arch-shaped member having axially spaced first and second ends and an apex intermediate said ends spaced radially therefrom, first and second connecting means for fixedly connecting said first and second ends respectively of said member with one of said conduits, contact means connected with said apex for contacting the other of said conduits; and at least one peripherally extending strut connecting said support elements to brace them together.

2. An electrical cable as defined in claim 1 wherein said contact means comprises a surface carried by said apex in sliding contact with adjacent portions of the other of said conduits.

3. An electrical cable as defined in claim 2 wherein a ball bearing is mounted on said apex and wherein said surface comprises an exterior peripheral region of said ball bearing.

4. An electrical cable as defined in claim 3 wherein the radial distance between said apex and the one of said conduits to which said arch member is attached is considerably less than the axial distance between said ends thereof thereby configuring said member as a bow of relatively shallow curvature.

5. An electrical cable as defined in claim 1 wherein at least one of said first and second connecting means comprises:

an intermediate member extending about at least a portion of the periphery of said inner conduit in spaced relation therefrom, adjacent said ends of said support elements being fixedly secured to said intermediate member; and means connected with said intermediate member providing contact with said inner conduit at points spaced about the periphery thereof for supporting said intermediate member.

6. An electrical cable as defined in claim 5 wherein said intermediate member comprises a ring encircling and spaced from said inner conduit.

7. An electrical cable as defined in claim 5 wherein said means for supporting said intermediate member comprises a plurality of pins extending radially inwardly into contact with said inner conduit.

8. An electrical cable as defined in claim 7 wherein said pins at their radially inward extremities are provided with points in contact with said inner conduit.

9. An electrical cable as defined in claim 7 wherein said pins are angularly displaced on said intermediate member out of alignment with said support elements.

10. An electrical cable as defined in claim 1 wherein said arch member if of skid-shaped configuration having a relatively high degree of curvature in relation to its length.

11. In the assembly of an electrical cable of the type including spaced inner and outer, generally tubular conduits in which the inner conduit is adapted to enclose at least one strand of superconductive material immersed in liquid coolant passed through the inner circuit, a method of connecting the inner and outer conduits including the steps of, providing at least two support elements, each configured as a slender arched-shaped member having axially spaced first and second ends and an apex intermediate the ends spaced radially therefrom, applying force to axially opposite ends of each support element to cause it to be pretensioned, while the support element is in the pretensioned condition, fixedly securing its opposite axial ends to one of said conduits with its apex facing radially toward the other of said conduits, and moving the inner conduit into the outer conduit to cause said support elements to extend between said conduits maintaining them in spaced coaxial relation.

* * * * *